United States Patent [19]

Scott

[11] Patent Number: 4,636,592
[45] Date of Patent: Jan. 13, 1987

[54] SPEAKER MOUNTING FOR LINED HELMET

[75] Inventor: Anthony W. Scott, Oberlin, Ohio

[73] Assignee: Helmet Sound, Inc., Oberlin, Ohio

[21] Appl. No.: 677,750

[22] Filed: Dec. 3, 1984

[51] Int. Cl.⁴ ............................................ H04M 1/05
[52] U.S. Cl. ..................................................... 381/187
[58] Field of Search ........... 179/156 R, 156 A, 182 R; 181/129; 2/422, 423; 455/89, 90

[56] References Cited

U.S. PATENT DOCUMENTS

| | | | |
|---|---|---|---|
| 1,354,524 | 10/1920 | Timmons | 179/156 R |
| 2,619,639 | 12/1952 | Hendler | 179/156 A |
| 3,197,785 | 8/1965 | Simpson et al. | 2/423 |
| 3,239,842 | 3/1966 | Marchello | 2/423 |
| 3,497,874 | 3/1970 | Molitoris | 2/423 |
| 3,586,977 | 6/1971 | Lustig et al. | 179/156 R |
| 4,077,007 | 2/1978 | McKinney | 455/142 |
| 4,109,105 | 8/1978 | Von Statten | 381/80 |
| 4,130,803 | 12/1978 | Thompson | 455/344 |
| 4,152,553 | 5/1979 | White | 179/156 R |
| 4,357,711 | 11/1982 | Drefko et al. | 455/89 |
| 4,424,880 | 1/1984 | Murayama et al. | 181/129 |
| 4,471,174 | 9/1984 | Navo | 179/156 A |
| 4,538,034 | 8/1985 | French | 179/156 R |

FOREIGN PATENT DOCUMENTS

| | | | |
|---|---|---|---|
| 2706460 | 9/1977 | Fed. Rep. of Germany | 2/423 |
| 52-30418 | 3/1977 | Japan | 179/156 R |

Primary Examiner—Gene Z. Rubinson
Assistant Examiner—Danita R. Byrd
Attorney, Agent, or Firm—Grigsby, Gaca & Davies

[57] ABSTRACT

Apparatus and a method for mounting a speaker in a lined helmet whereby a speaker is placed in a covered cup attached to a blade and the blade is inserted between the lining and shell of the helmet so that the speaker will be located adjacent to the wearer's ear. The speaker is electrically connected to a signal source by a cable which passes through a hole in the side of the cup and is then connected to a jack. The jack is contained in a jack-holding member having a blade attached thereto so that the jack and cable may be removably attached to the helmet.

7 Claims, 12 Drawing Figures

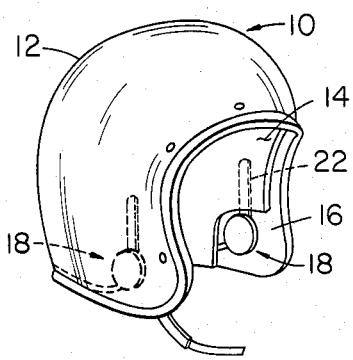
FIGURE 1
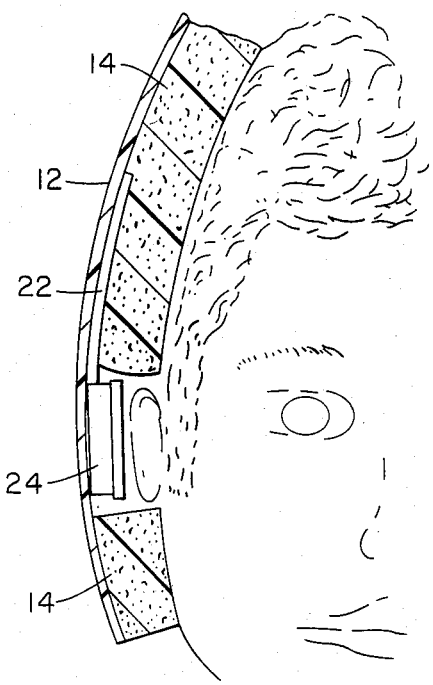
FIGURE 4
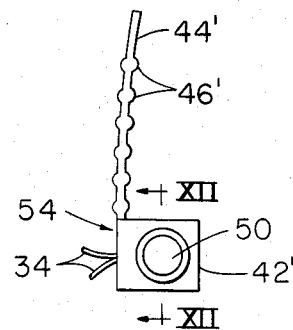
FIGURE II
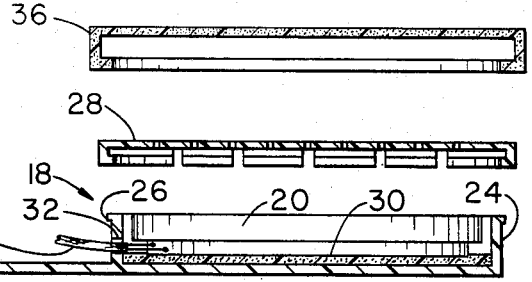
FIGURE 12
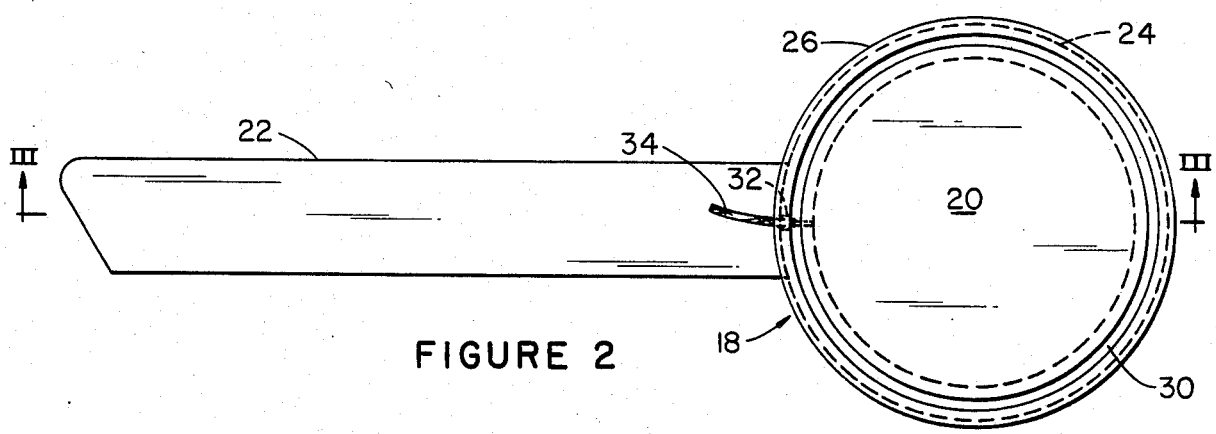
FIGURE 3
FIGURE 2

SPEAKER MOUNTING FOR LINED HELMET

BACKGROUND AND SUMMARY OF THE INVENTION

This invention relates to the mounting of radio or tape deck speakers within a protective helmet.

Motorcycle helmets and other protective headgear are often worn in environments with high noise levels. It has thus been recognized for a number of years that it may be desirable to equip such helmets with speakers or other sound generating devices for communication or entertainment. U.S. Pat. Nos. 4,357,711; 4,130,803; 4,109,105; and 4,077,007 illustrate helmets that have been specifically designed to meet this need. However, such helmets are relatively expensive and tend to be limited in their use to the components for which they were designed.

An object of my invention is to provide means for installing conventional portable radio or portable tape deck speakers in a conventional motorcycle helmet or other lined helmet.

It is a further object of my invention to provide means for mounting speakers within a helmet that will permit them to be readily removed by the user so that the risk of theft may be reduced when the helmet must be left unattended in a public place.

It is also an object of my invention to provide means for mounting speakers within a helmet that will make it easy to change components.

Other objects and purposes of the invention will be clear from the description of the preferred embodiment.

BRIEF DESSCRIPTION OF THE DRAWINGS

FIG. 1 is an isometric view of a conventional motorcycle helmet having speakers mounted in it in accordance with this invention.

FIG. 2 is an orthographic view of the speaker mounting bracket used in the preferred embodiment of this invention.

FIG. 3 is a sectional view on the line III—III of FIG. 2.

FIG. 4 is a cutaway view of a helmet as worn with a speaker mounted therein.

FIG. 11 is an orthographic view of a second embodiment of the jack mounting bracket utilized in this invention.

FIG. 12 is a sectional view on the line XII—XII of FIG. 11.

DESCRIPTION OF THE PREFERRED EMBODIMENTS

Figure 5:
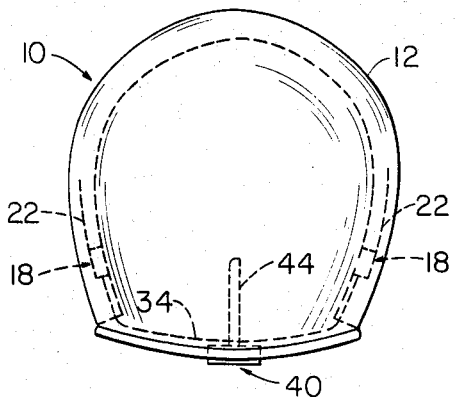
FIG. 5 is a rear view of the helmet shown in FIG. 1.

Referring to the drawings, FIG. 1 shows a conventional motorcycle helmet 10 comprised of an outer shell 12 and a lining 14 made of expanded synthetic resin or other resilient material. As is common in such helmets, a void 16 in either side of the lining 14 provides space for the wearer's ears. A speaker bracket 18 is provided for mounting a speaker 20 in each of the voids 16 so as to be adjacent to the ears of the wearer.

As is shown in more detail in FIGS. 2 and 3, the speaker bracket 18 is generally comprised of a blade 22 and a cup 24. A lip 26 around the top of the cup 24 engages a snap-on perforated cap 28. A disk-shaped cushion 30 made of soft plastic foam or similar material is disposed in the bottom of the cup 24. The depth of the cup 24 is such that, when a speaker 20 is placed in the cup and the perforated cap 28 is snapped on the lip 26, the speaker will be pressed into the cushion 30 and held firmly in place. The cap 28 may, of course, be removed in order to service or replace the speaker 20.

The wall of the cup 24 is pierced by a hole 32 to accommodate an electrical cable 34 leading from the speaker 20.

An ear cushion 36 made of plastic foam or similar material may be provided to prevent the cap 28 from rubbing the user's ear.

A speaker is mounted in accordance with the present invention by inserting the blade 22 of the speaker bracket 18 between the helmet lining 14 and the outer shell 12, as is illustrated in FIGS. 1, 4 and 5. The blade 22 should be of sufficient length and elasticity that the stress created by the bending due to the curvature of the outer shell 12 will hold the cup 24 against the shell 12 and away from the wearer's ear. I have found that a speaker bracket 18 made of polypropylene will work well when the blade 22 is 3 inches (7.62 cm.) long, ¾ inches (1.91 cm.) wide, and 0.06 inches (0.15 cm.) thick.

Figure 6:
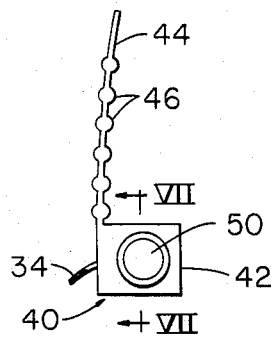
FIG. 6 is an orthographic view of the jack mounting bracket used in the preferred embodiment of this invention.
Figure 7:
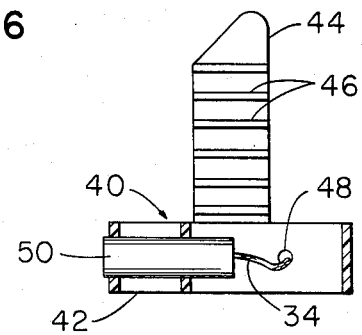
FIG. 7 is a sectional view on the line VII—VII of FIG. 6.
Figure 9:
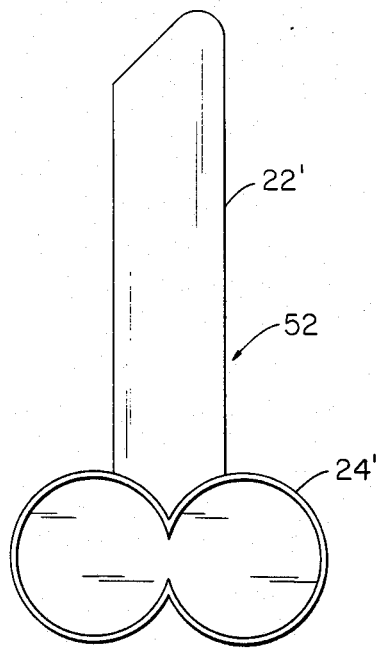
FIG. 9 is an orthographic view of a second embodiment of the speaker mounting bracket utilized in this invention.

After the speaker bracket 18 is inserted in the helmet 10, the cable 34 is disposed along the edge of the lining 14. As is shown in FIG. 5, the cable 34 is removably held in place by means of the speaker bracket 18 and a jack bracket 40. FIGS. 6 and 7 illustrate in more detail that the jack bracket 40 is comprised of a jack-holding member 42 and a blade 44 flush with the back thereof. The blade 44 is similar to the blade 22 of speaker bracket 18 except that evenly spaced transverse ridges 46 are provided to more positively engage the helmet lining 14. These ridges are considered desirable because the more exposed location of the jack bracket 40 exposes it to an increased risk of inadvertant dislocation.

The blade 44 of the jack bracket 40 is inserted between the lining 14 and the outer shell of the helmet 10 so that the jack holding member 44 projects toward the rear of the helmet. The cables 34 from the speakers 20 on either side of the helmet are disposed along the top of the jack-holding member 42 and then led through a hole 48 in the back of the jack-holding member and connected to the two channel jack 50. A plug, not shown, may then be inserted in the jack to electrically connect the speakers 20 to a portable radio or other signal source.

It is often necessary for the user to leave a motorcycle helmet unattended in a public place for periods ranging from a few minutes to several hours. In order to reduce the risk of theft in such situations, the speakers and jack mounted as described above may be removed when the helmet is left and remounted by the user when he returns.

Figure 8:
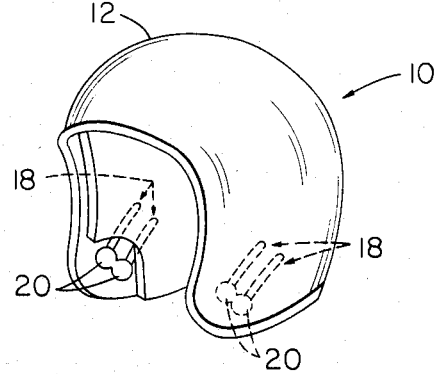
FIG. 8 is an isometric view of a helmet having two speakers mounted on each side.
Figure 10:
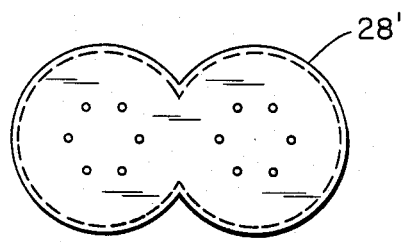
FIG. 10 is an orthographic view of a cap used with the embodiment illustrated in FIG. 9.

FIG. 8 illustrates the mounting of two speakers 20 on each side of a helmet 10 by means of a pair of speaker brackets 18. Speakers may be mounted in this way if the user wishes to monitor four channels. This may also be accomplished by means of the embodiment illustrated in FIGS. 8 through 12. In this embodiment a speaker bracket 52 is comprised of a blade 22' and a cup 24' having two connected chambers, each of which can contain a speaker. A cap 28' is provided to cover the double cup 22'. The speaker bracket 52 can, of course, be inserted in a helmet in the same manner that a speaker bracket 18 is inserted.

While a pair of jack brackets 40 might be used when monitoring four channels, it is considered desirable to utilize a double jack bracket of the type illustrated in FIGS. 11 and 12 and generally designated 54. The jack bracket 54 is comprised of an elongated jack holding member 42' containing a pair of two channel jacks, each of which is connected to a pair of speakers through cables 34. A pair of transversly ridged blades 44' are attached to the back of the jack-holding member 42'. The double jack bracket 54 can be inserted in a helmet in the same manner that a jack bracket 40 is inserted.

Many changes and modifications in the above described embodiments can, of course, be carried out without departing from the scope thereof.

I claim:

1. An apparatus for mounting a speaker in a helmet having a curved outer shell and a lining, said apparatus comprising a blade and means for securing at least one speaker to the blade, said blade having length and elasticity such that when the blade is inserted between the outer shell and the lining of a lined helmet the curvature of the outer shell will cause the blade to be stressed sufficiently to hold said speaker securing means away from the ear of a wearer of the helmet.

2. An apparatus as in claim 1 wherein the means for securing at least one speaker to the blade comprises;
   a. a cup attached to one end of the blade, and
   b. a cap removably covering the cup.

3. An apparatus as in claim 2 wherein the cup attached to the blade has two chambers, each of which can contain a speaker.

4. An apparatus as in claim 2 further including means for electrically connecting a speaker contained in the cup to a signal source.

5. An apparatus as in claim 4;
   a. wherein the means for electrically connecting a speaker contained in the cup to a signal source is a cable connected to the speaker and extended through an opening in the side of the cup, and
   b. further including means for removably attaching the cable to a helmet.

6. An apparatus for mounting a speaker in a lined helmet comprising;
   a. blade,
   b. a cup attached to one end of the blade,
   c. a cap removably covering the cup,
   d. means for electrically connecting a speaker container in the cup to a signal source, said means comprising a jack and a cable extending through an opening in the cup and connecting the jack to the speaker, and
   e. a jack-holding member supporting the jack and having a blade attached thereto.

7. An apparatus as in claim 6 wherein the blade attached to the jack-holding member has at least one transverse ridge thereon.

* * * * *